United States Patent
Izumi et al.

(10) Patent No.: US 8,603,364 B2
(45) Date of Patent: Dec. 10, 2013

(54) PHOSPHOR

(75) Inventors: Makoto Izumi, Osaka (JP); Noboru Iwata, Osaka (JP); Kazunori Annen, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 138 days.

(21) Appl. No.: 13/213,782

(22) Filed: Aug. 19, 2011

(65) Prior Publication Data

US 2012/0056134 A1 Mar. 8, 2012

(30) Foreign Application Priority Data

Sep. 6, 2010 (JP) ................................. 2010-199010

(51) Int. Cl.
C09B 67/00 (2006.01)
H01C 13/00 (2006.01)
C23C 14/00 (2006.01)
C25B 11/00 (2006.01)
C25B 13/00 (2006.01)

(52) U.S. Cl.
USPC .............. 252/501.1; 204/192.12; 204/298.13; 252/500; 252/518.1; 252/519.51

(58) Field of Classification Search
USPC .......... 204/192.12, 298.13; 252/501.1, 518.1, 252/519.51, 500; 349/106; 359/891
See application file for complete search history.

(56) References Cited

U.S. PATENT DOCUMENTS

| | | | |
|---|---|---|---|
| 2008/0213558 A1 | 9/2008 | Murase et al. | |
| 2008/0308795 A1* | 12/2008 | Lee et al. | 257/43 |
| 2009/0185113 A1* | 7/2009 | Chung | 349/106 |
| 2009/0250668 A1* | 10/2009 | Shimane et al. | 252/519.51 |
| 2012/0118386 A1* | 5/2012 | Chen et al. | 136/265 |

FOREIGN PATENT DOCUMENTS

| | | |
|---|---|---|
| JP | 9-115464 | 5/1997 |
| JP | 2006-282977 | 10/2006 |
| JP | 2009-87756 | 4/2009 |
| JP | 2009-175664 | 8/2009 |
| WO | WO 2010/028112 A2 * | 3/2010 |

OTHER PUBLICATIONS

Ito, Y. et al. (2007). "Mechanism of Photoluminescence Enhancement in Single Semiconductor Nanocrystals on Metal Surfaces." *Physical Review B*. 75:033309(1-4).
Murray, C. B. et al. (1993). "Synthesis and Characterization of Nearly Monodisperse CdE (E = S, Se, Te) Semiconductor Nanocrystallites." *Journal of Americal Chemical Society*. 115(19):8706-8715.
Wang, X. et al. (Jun. 4, 2009). "Non-Blinking Semiconductor Nanocrystals." *Nature*. 459:686-689.

* cited by examiner

*Primary Examiner* — Bijan Ahvazi
(74) *Attorney, Agent, or Firm* — Morrison & Foerster LLP

(57) ABSTRACT

A phosphor includes semiconductor nanoparticles formed of compound semiconductor, and conductive transparent compounds. The semiconductor nanoparticles may be dispersed in or on the conductive transparent compounds. The resistivity of the conductive transparent compounds is preferably less than or equal to 10 Ωcm.

7 Claims, 6 Drawing Sheets

PHOSPHOR

This nonprovisional application is based on Japanese Patent Application No. 2010-199010 filed on Sep. 6, 2010, with the Japan Patent Office, the entire contents of which are hereby incorporated by reference.

BACKGROUND OF THE INVENTION

1. Field of the Invention

The present invention relates to phosphors, more particularly a phosphor including semiconductor nanoparticles and conductive transparent compounds.

2. Description of the Background Art

In recent years, illumination devices including light emitting diode elements as the constituent component are attracting attention. A light emitting diode element has superior properties such as saving power, a long product lifetime, and low environmental load. Particularly, there is developed a light emitting device for various illuminations that can provide white light by combining a light emitting diode element emitting blue light or ultraviolet light with various phosphors excited by light emitted from the light emitting diode element and capable of luminescence at a desired wavelength. Such light emitting devices raise the expectation for illumination devices replacing incandescent lamps and fluorescent lamps.

Conventionally, rare earth activation phosphors have been used for the fluorescent material in light emitting devices. In order to enable the production of a light emitting device having high color rendering property and high luminance efficiency, the approach of employing semiconductor nanoparticle phosphors is now attracting attention. A semiconductor having an energy gap of the direct type exhibits phosphorescence based on a wavelength inherent to that substance. However, by restricting the particle size to approximately the level of the Bohr radius, the kinetic energy of the particles becomes discontinuous in both the balance band and conduction band, leading to a shorter emission wavelength in proportion to the particle size. Therefore, the emission wavelength can be controlled arbitrarily for a phosphor employing semiconductor nanoparticles (hereinafter, also referred to as semiconductor nanoparticle phosphor), differing from a conventional phosphor. Further, by combining a plurality of types of semiconductor nanoparticle phosphors, a light emitting device that produces light at various desired spectra can be obtained.

As conventional semiconductors serving as the material of semiconductor nanoparticles, research and reports have been provided mainly on CdSe (refer to C. B. Murray, D. J. Norris, and M. G. Bawendi, Synthesis and Characterization of Nearly Monodisperse CdE (E=S, Se, Te) Semiconductor Nanocrystallites, "Journal of the American Chemical Society", 115, 1993, pp. 8706-8715) for semiconductors of the II-VI group compound, and on InP for semiconductors of the III-V group compound. Since a semiconductor nanoparticle is small in size, the ratio of surface constituting the particle is high. It is considered that defects at the surface induce non-radiative transition, leading to lower luminance efficiency. In view of such defects, each of the semiconductor nanoparticles is covered with a substance having a band gap greater than that of the semiconductor material such as zinc sulfide, achieving a core/shell structure for the semiconductor nanoparticle. Accordingly, the luminance efficiency is improved significantly. Furthermore, by protecting the outer side of the shell with a modified organic compound, sufficient luminance efficiency can be obtained.

A semiconductor nanoparticle protected with a modified organic compound is stable in liquid phase. However, semiconductor nanoparticles must be dispersed in a solid since it is not suitable for industrial application in the liquid phase.

For example, Japanese Patent Laying-Open No. 2006-282977 discloses the technique of dispersing semiconductor nanoparticles in a glass matrix to prevent reaction caused by oxygen and/or water to avoid degradation. Glass is suitable as the matrix material for phosphors since it is transparent. However, the luminance efficiency of semiconductor nanoparticles that is 70% in liquid will become as low as 30% after dispersion in glass. This luminance efficiency is a value defined as the ratio of the number of photons radiated as photoluminescence to the number of absorbed photons.

It is known that semiconductor nanoparticles dispersed on a metal substrate typically of gold has the luminescence intensity increased, as compared to the case where semiconductor nanoparticles are dispersed on a glass substrate (refer to Yuichi Ito, Kazunari Matsuda, and Yoshihiko Kanemitsu, Mechanism of photoluminescence enhancement in single semiconductor nanocrystals on metal surfaces, "Physical Review B", 75, 2007, p. 033309 1-4). The luminescence intensity refers to the energy intensity of photoluminescence generated when exciting light of a predetermined energy is radiated. The relationship is represented by the following Equation (1).

Luminescence intensity=intensity of exciting light× optical absorptance by phosphor×luminance efficiency ×phosphor energy per photon/energy of exciting light per photon    Equation (1).

Increase in the luminescence intensity is an effect caused by the improvement in luminance efficiency in view of all the particles. Single semiconductor nanoparticles on a glass substrate have a luminescence intensity corresponding to a flickering phenomenon repeating ON and OFF over time, whereas semiconductor nanoparticles on a metal substrate do not exhibit a flickering phenomenon. Therefore, semiconductor nanoparticles on a metal substrate can exhibit stable and strong light emission, as compared to semiconductor nanoparticles on a glass substrate, when exciting light of the same luminescence intensity is employed.

The flickering phenomenon is considered to be caused mainly by the charge up of semiconductor nanoparticles due to electrons that are discharged outside, among the excitons generated in the semiconductor nanoparticles by photoexcitation (refer to Xiaoyong Wang, Xiaofan Ren, Keith Kahen, Megan A. Hahn, Manju Rajeswaran, Sara Maccagnano-Zacher, John Silcox, George E. Cragg, Alexander L. Efros and Todd D. Krauss, Non-blinking semiconductor nanocrystals, "NATURE", 459, 2009, pp. 686-689). One difference between a glass substrate and a metal substrate is that the former is an insulator whereas the latter is conductive. Since the glass substrate is an insulator, the electrons discharged from the semiconductor nanoparticles dispersed on the glass substrate must jump over a high energy barrier in order to return back to the semiconductor nanoparticles. In contrast, the energy barrier is low on a metal substrate. The electrons discharged from semiconductor nanoparticles can readily return to the semiconductor nanoparticles. Since photoluminescence cannot be exhibited under the state where semiconductor nanoparticles are charged up, the luminance efficiency of the semiconductor nanoparticles dispersed on the glass substrate will be lowered.

It has been confirmed that luminescence intensity is increased by dispersing semiconductor nanoparticles on a metal substrate, as compared to the case where a glass substrate is used, as set forth above. However, gold possesses the property of absorbing and reflecting visible light, as well as being colored, causing the exciting light and/or fluorescence to be absorbed and scattered. Therefore, it is not preferable to use gold as the base substance directed to dispersing a phosphor in the production of illumination devices.

SUMMARY OF THE INVENTION

In view of the foregoing, an object of the present invention is to provide a phosphor having superior luminescence intensity by improving the luminance efficiency of semiconductor nanoparticles.

The present invention is directed to a phosphor including semiconductor nanoparticles formed of compound semiconductor, and conductive transparent compounds.

Preferably in the phosphor of the present invention, semiconductor nanoparticles are dispersed in the conductive transparent compounds.

Preferably in the phosphor of the present invention, semiconductor nanoparticles are dispersed on the conductive transparent compounds.

Preferably in the phosphor of the present invention, the resistivity of the conductive transparent compounds is less than or equal to 10 Ωcm.

Preferably in the phosphor of the present invention, the resistivity of the conductive transparent compounds is less than or equal to 1 Ωcm.

Preferably in the phosphor of the present invention, the conductive transparent compounds are formed of metal oxide having conductance.

Preferably in the phosphor of the present invention, the metal oxide is formed of amorphous metal oxide including at least one type of atom selected from the group consisting of indium, gallium, zinc, and tin.

Preferably in the phosphor of the present invention, the semiconductor nanoparticles are formed of at least one of III-V group compound semiconductor and II-VI group compound semiconductor.

Preferably in the phosphor of the present invention, the average particle size of the semiconductor nanoparticles is more than or equal to two times the Bohr radius.

Preferably in the phosphor of the present invention, each of the semiconductor nanoparticles is formed of a semiconductor crystal core, and a shell layer covering the semiconductor crystal core.

Preferably in the phosphor of the present invention, the shell layer is formed of a substance having an energy gap larger than the energy gap of the semiconductor crystal core.

According to the present invention, a phosphor having superior luminescence intensity can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
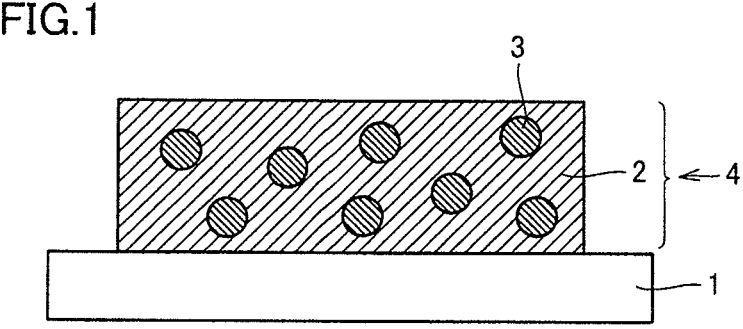
FIG. 1 is a schematic sectional view of a phosphor provided on a substrate according to a first embodiment.

Embodiments of the present invention will be described in detail hereinafter with reference to the drawings. In the drawings, the dimensional relationship such as the length, size and width is not necessarily drawn to scale for the sake of rendering the drawing clear and simple.

<First Embodiment>

Referring to FIG. 1, a phosphor 4 according to a first embodiment of the present invention is provided on a substrate 1. Phosphor 4 includes conductive transparent compounds 2 and semiconductor nanoparticles 3. The contact between semiconductor nanoparticles 3 and conductive transparent compounds 2 allows the luminance efficiency of semiconductor nanoparticles 3 to be improved, whereby the luminescence intensity of phosphor 4 is increased. First, each constituent element of the phosphor will be described, followed by description of the overall structure.

Semiconductor Nanoparticle

In an embodiment of the present invention, semiconductor nanoparticles are formed of at least one of III-V group compound semiconductor and II-VI group compound semiconductor. In the present description, "III-V group semiconductor" implies semiconductor having III group elements (B, Al, Ga, In, Ti) and V group elements (N, P, As, Sb, Bi) coupled. "II-VI group compound semiconductor" implies semiconductor having II group elements (Mg, Zn, Cd, Hg) and VI group elements (O, S, Se, Te, Po) coupled. A "nanoparticle" refers to a particle having a diameter greater than or equal to several nm and less than or equal to several thousand nm.

For the III-V group compound semiconductor, it is preferable to use at least one selected from the group consisting of InN, InP, InGaN, InGaP, AlInN, AlInP, AlGaInN, and AlGaInP, more preferably at least one selected from the group consisting of InN, InP, InGaN and InGaP.

For the II-VI group compound semiconductor, it is preferable to use at least one selected from the group consisting of CdO, CdS, CdSe, CdTe, ZnO, ZnS, ZnSe, ZnTe, ZnCdO, ZnCdS, and ZnCdSe, more preferably at least one selected from the group consisting of CdSe, ZnO, and ZnCdO.

The III-V group semiconductor and II-VI group semiconductor of the composition set forth above has a band gap energy emitting visible light. Therefore, by controlling the particle size and the mixed crystal ratio of the semiconductor nanoparticles, the emission wavelength of the semiconductor nanoparticles can be adjusted to an arbitrary wavelength of the visible light region.

The III-V group compound semiconductor or II-VI group compound semiconductor has a band gap preferably greater than or equal to 1.8 eV and less than or equal to 3.1 eV. More specifically, when semiconductor nanoparticles are used for red phosphor, the band gap is preferably greater than or equal to 1.85 eV and less than or equal to 2.05 eV. When semiconductor nanoparticles are used for green phosphor, the band gap is preferably greater than or equal to 2.3 eV and less than or equal to 2.5 eV. When semiconductor nanoparticles are used for blue phosphor, the band gap is preferably greater than or equal to 2.65 eV and less than or equal to 2.8 eV.

The average particle size of semiconductor nanoparticles is preferably greater than or equal to 0.1 nm and less than or equal to 100 nm, more preferably greater than or equal to 0.5 nm and less than or equal to 50 nm, further preferably greater than or equal to 1 nm and less than or equal to 20 nm. An average particle size in the aforementioned range can suppress scattering of exciting light at the surface layer of semiconductor nanoparticles, causing the semiconductor nanoparticles to absorb exciting light. If the average particle size of the semiconductor nanoparticles is less than 0.1 nm, aggregation will readily occur between semiconductor nanoparticles due to the extremely small particle size, which is not preferable. If the average particle size exceeds 100 nm, exciting light will be scattered. This is not preferable since the luminance efficiency of semiconductor nanoparticles will be degraded.

The average particle size of the semiconductor nanoparticles is preferably more than or equal to two times the Bohr radius. As used herein, "Bohr radius" represents the spread of the existence probability of excitons, and is represented by the following Equation (2).

$$y = 4\pi\epsilon h^2 \cdot me^2 \qquad \text{Equation (2)}$$

In Equation (2), y: Bohr radius; $\epsilon$: electric permittivity; h: Planck's constant; m: effective mass; e: elementary charge.

When the average particle size of the semiconductor nanoparticles is less than or equal to two times the Bohr radius, there is a tendency of the band gap of the semiconductor nanoparticles being increased by the quantum size effect. In this case, the band gap of group compound semiconductor or II-VI group compound semiconductor constituting the semiconductor nanoparticles is preferably greater than or equal to 1.8 eV and less than or equal to 3.1 eV.

Each semiconductor nanoparticle may take a core/shell structure having a semiconductor crystal core of compound semiconductor covered with a shell layer formed of a different type of compound semiconductor. For the substance constituting the shell layer, a compound semiconductor having a band gap larger than that of the substance constituting the core is preferable. By using a compound semiconductor having a band gap greater than that of the substance constituting the core for the shell layer, the luminance efficiency of the semiconductor nanoparticles can be improved. The shell layer may take a stacked structure formed of a plurality of shell layers.

Each semiconductor nanoparticle may be protected by a modified organic compound. By the bonding of the modified organic compound to the surface of a semiconductor nanoparticle for capping, the surface defect of semiconductor nanoparticles will be suppressed, allowing the luminance efficiency of semiconductor nanoparticles to be improved.

For the modified organic compound, organic compounds including nitrogen-containing functional group, sulfur-containing functional group, acidic group, amide group, phosphine group, phosphine oxide group, hydroxyl group, straight-chain alkyl group and the like can be employed. For example, octadecylamine, hexadecylamine or the like can be cited as such modified organic compounds.

Conductive Transparent Compound

In an embodiment of the present invention, a conductive transparent compound is transparent in the region of visible light. The conductive transparent compound is preferably metal oxide including at least one type of atom selected from the group consisting of In, Ga, Zn and Sn. For example, $InGaZnO_4$ and the like are preferable. By using such metal oxide for the conductive transparent compound, superior luminance efficiency can be exhibited without the semiconductor nanoparticles presenting a flickering phenomenon. Moreover, since the conductive transparent compound is transparent in the region of visible light, light absorption and/or reflection by the conductive transparent compound can be prevented.

More preferably, the conductive transparent compound is amorphous. An amorphous conductive transparent compound is advantageous in that, when a conductive transparent compound is provided on a flexible substrate such as a plastic film, the property of the conductive transparent compound will not be degraded even if the flexible substrate is bent.

The resistivity of the conductive transparent compound is preferably less than or equal to 10 $\Omega$m, more preferably less than or equal to 1 $\Omega$m. When the resistivity of the conductive transparent compound is less than or equal to 10 $\Omega$m, the charge up of some of the semiconductor nanoparticles can be prevented. When the resistivity of the conductive transparent compound is less than or equal to 1 $\Omega$m, the charge up of further more semiconductor nanoparticles can be prevented.

Substrate

According to an embodiment of the present invention, a phosphor is provided on a substrate. The type of substrate is not particularly limited, provided that is transparent. For example, a glass substrate, plastic substrate, or a plastic film may be used.

Phosphor Structure

According to a first embodiment, phosphor 4 includes conductive transparent compounds 2 and semiconductor nanoparticles 3. Semiconductor nanoparticles 3 are dispersed in conductive transparent compounds 2. The contact between semiconductor nanoparticles 3 and conductive transparent compounds 2 allows the luminance efficiency of semiconductor nanoparticles 3 to be improved, causing improvement of the luminescence intensity of phosphor 4.

Method of Producing Phosphor

Phosphor 4 according to the first embodiment can be produced by the method set forth below.

Substrate 1 is prepared.

Then, a thin film formed of a conductive transparent compound is deposited on substrate 1 by vapor-phase growth with a polycrystalline compact including an element constituting conductive transparent compound as a target. For the vapor-phase growth method, sputtering is preferably employed. By introducing oxygen gas and nitrogen gas into the chamber during the film growing mode, the resistivity of the conductive transparent compound can be controlled without losing the transparency of the conductive transparent compound.

Then, semiconductor nanoparticles 3 dispersed in an organic solvent such as toluene are spread by spin coating on a thin film formed of conductive transparent compound.

A thin film formed of conductive transparent compound is deposited on semiconductor nanoparticles 3 using a vapor-phase growth method again to obtain phosphor 4.

<Second Embodiment>

Figure 2:
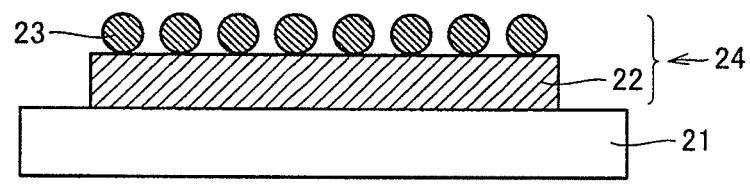
FIG. 2 is a schematic sectional view of a phosphor provided on a substrate according to a second embodiment.

Referring to FIG. 2, a phosphor 24 according to a second embodiment of the present invention is provided on a substrate 21. Phosphor 24 includes conductive transparent compounds 22 and semiconductor nanoparticles 23. Semiconductor nanoparticles 23 are dispersed on conductive transparent compounds 22.

The contact between semiconductor nanoparticles 23 and conductive transparent compound 22 allows the luminance efficiency of semiconductor nanoparticles 23 to be improved, causing improvement in the luminescence intensity of phosphor 24.

In the second embodiment, the same as those in the first embodiment can be employed for substrate 21, semiconductor nanoparticles 23 and conductive transparent compound 22.

Each semiconductor nanoparticle 23 is distributed so as not to form contact with each other on conductive transparent compounds 22, which is preferable from the standpoint of improving the luminance efficiency.

Phosphor 24 of the second embodiment can be produced by a method set forth below.

Substrate 21 is prepared.

Then, a thin film formed of conductive transparent compounds 22 is deposited on substrate 21 by a vapor-phase growth method with a polycrystalline compact including an element constituting conductive transparent compounds 22 as a target. It is preferable to use sputtering for the vapor-phase growth method. By introducing oxygen gas and nitrogen gas into the chamber during film growth, the resistivity of the conductive transparent compound can be controlled without losing the transparency of conductive transparent compounds.

Then, semiconductor nanoparticles 23 dispersed in an organic solvent such as toluene are spread by spin coating on a thin film formed of conductive transparent compounds 22 to obtain phosphor 24.

EXAMPLE

The present invention will be described in further detail based on, but not limited to, examples.

Example 1

A glass substrate was prepared. On the glass substrate, a target including In, Ga, Zn and O was sputtered in a gas atmosphere having the partial pressure of Ar and $N_2$ adjusted to attain 0.1944 Pa, and 0.0056 Pa, respectively, to grow a thin film formed of transparent compound, having a thickness of 50 nm. The resistivity of the obtained thin film was measured by the direct-current four-probe method. The measurement was 0.107 Ωm.

The semiconductor nanoparticles dispersed in the toluene solvent were dispersed on a thin film formed of the transparent compound set forth above using the spin coating method to obtain a phosphor of Example 1. For the used semiconductor nanoparticles, a semiconductor crystal core formed of CdSe and having a diameter of approximately 3 nm was covered with a shell layer of ZnS, further having octadecylamine coupled on the outer side of the shell layer. In the spin coating method, the rpm was 1000.

The obtained phosphor was irradiated with exciting light having a wavelength of 500 nm and a luminescence intensity of 1.21 mW/cm². The emission spectrum of the photoluminescence obtained from the phosphor was measured. Emission spectrum measurement was carried out by placing a phosphor in an integrating sphere, and introducing the light emitted from the phosphor to a detector through optical fiber attached to a side face of the phosphor. The emission spectrum of Example 1 is shown in FIG. 3.

Figure 3:
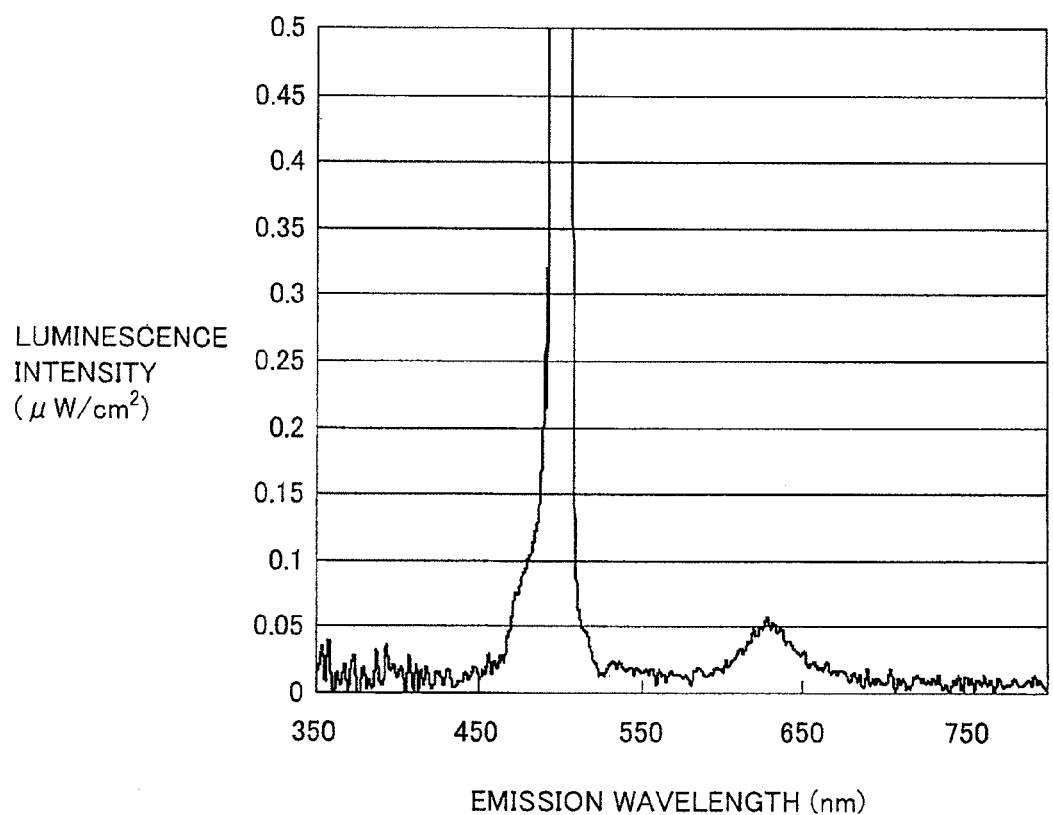
FIG. 3 represents the emission spectrum of a phosphor of Example 1 at the incidence of exciting light having a wavelength of 500 nm.

In FIG. 3, the strong light emission seen about 500 nm represents the reflection of the exciting light by the phosphor. In Example 1, an emission peak about 630 nm can also be observed. This represents light emission by the photoluminescence from semiconductor nanoparticles. In Example 1, the luminescence intensity was 15.3 µW/cm².

The resistivity of the thin film formed of a transparent compound as well as the emission peak wavelength, luminescence intensity, luminescence intensity/exciting light intensity (%) of the phosphor of Example 1 are shown in Table 1.

TABLE 1

| | Thin Film Formed of Transparent Compound | | Phosphor | | |
|---|---|---|---|---|---|
| | Presence | Resistivity | Emission Peak Wavelength | Luminescence Intensity | Luminescence Intensity/Exciting Light Intensity |
| Example 1 | Yes | 0.107 Ωcm | 630 nm | 15.3 µW/cm² | 1.3% |
| Comparative Example 1 | Yes | 1207 Ωcm | — | — | — |
| Comparative Example 2 | No | — | — | — | — |

Comparative Example 1

The phosphor of Comparative Example 1 was produced in a manner basically similar to that of Example 1, provided that the ambient condition during sputtering differed in the deposition of a thin film formed of transparent compound. Specifically, sputtering was carried out in a gas atmosphere having the partial pressure of Ar adjusted to attain 0.2 Pa. The resistivity of the obtained thin film formed of transparent compound was 1207 Ωm.

The obtained phosphor was irradiated with exciting light having a wavelength of 500 nm and luminescence intensity of 1.21 mW/cm², in accordance with a method similar to that of Example 1. The emission spectrum of photoluminescence obtained by the phosphor was measured. The emission spectrum of Comparative Example 1 is shown in FIG. 4.

Figure 4:
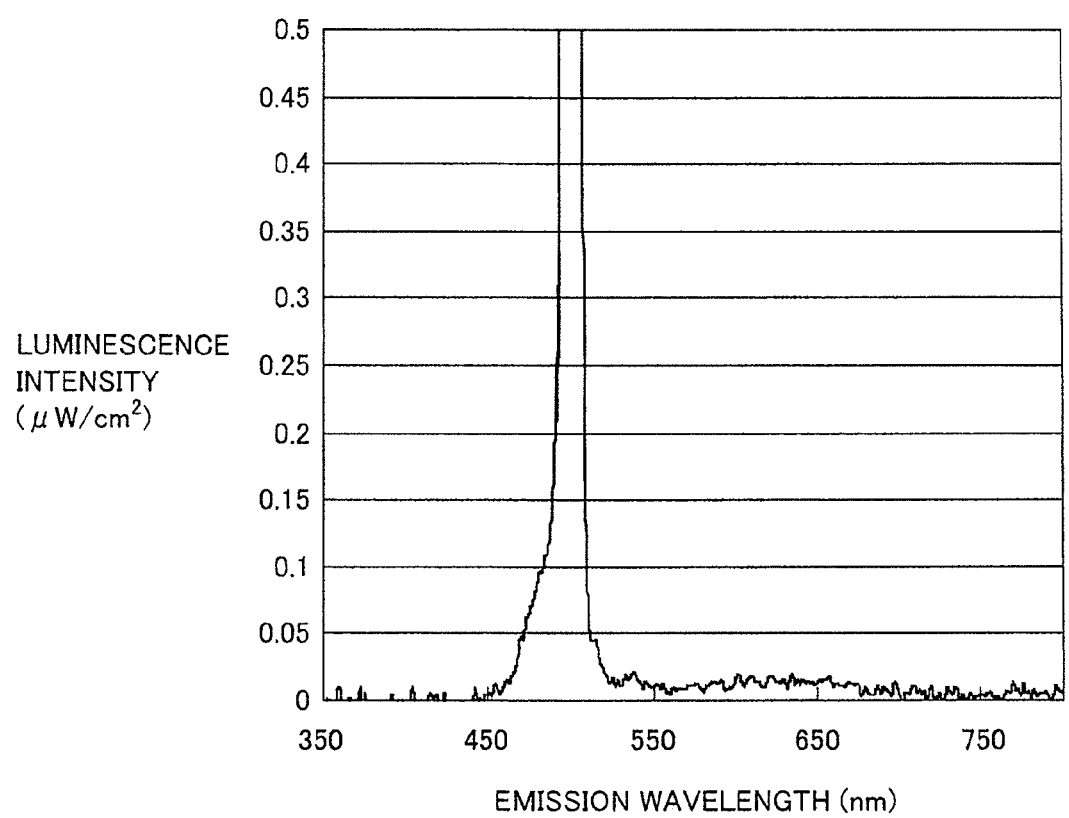
FIG. 4 represents the emission spectrum of a phosphor of Comparative Example 1 at the incidence of exciting light having a wavelength of 500 nm.

Referring to FIG. 4, the strong light emission seen about 500 nm represents the reflection of the exciting light by the phosphor. In Comparative Example 1, an emission peak in the vicinity of 630 nm, indicating light emission by photoluminescence from semiconductor nanoparticles, could not be observed.

Comparative Example 2

A glass substrate was prepared. Then, semiconductor nanoparticles dispersed in a toluene solvent were dispersed on the glass substrate using a spin coating method to obtain a phosphor of Comparative Example 2. Semiconductor nanoparticles similar to those of Example 1 were used. The rpm in the spin coat method was 1000.

The obtained phosphor was irradiated with exciting light having a wavelength of 500 nm and luminescence intensity of 1.21 mW/cm$^2$, in accordance with a method similar to that of Example 1, and the emission spectrum of photoluminescence obtained from the phosphor was measured. The emission spectrum of Comparative Example 2 is shown in FIG. 5.

Figure 5:
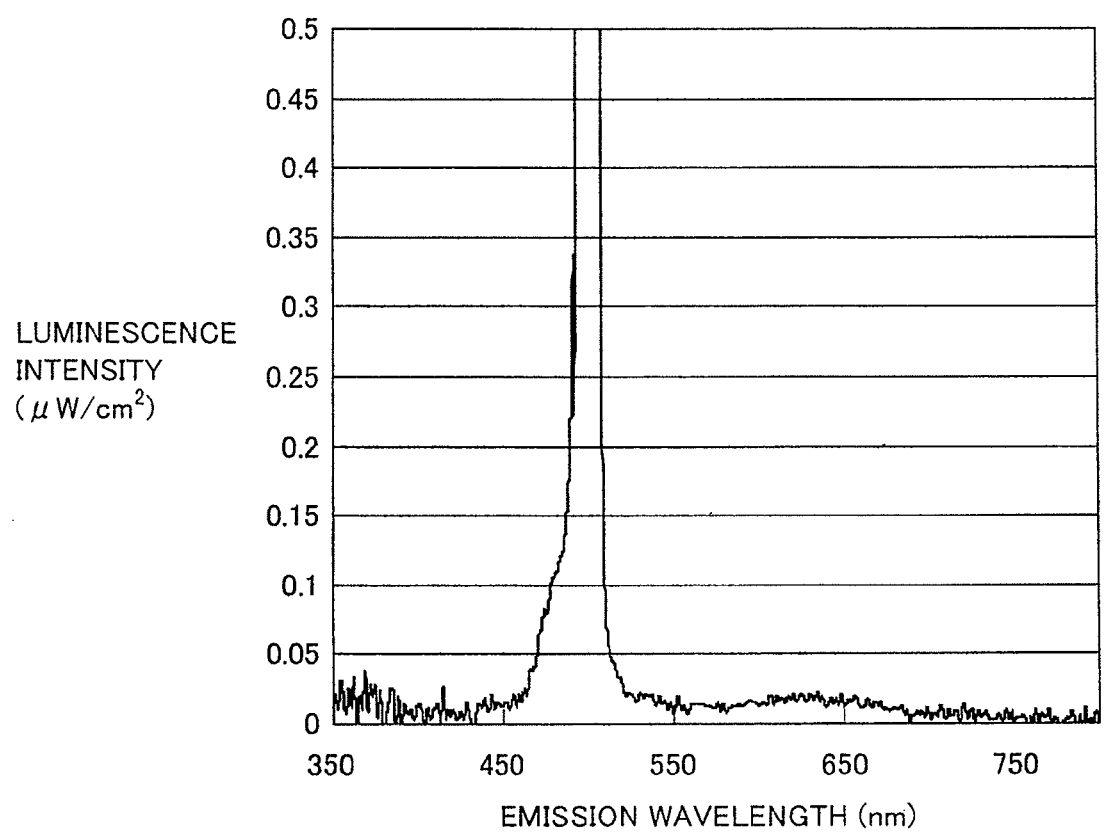
FIG. 5 represents the emission spectrum of a phosphor of Comparative Example 2 at the incidence of exciting light having a wavelength of 500 nm.

Referring to FIG. 5, the strong light emission seen about 500 nm represents the reflection of the exciting light by the phosphor. In Comparative Example 2, an emission peak in the vicinity of 630 nm, indicating light emission by the photoluminescence from semiconductor nanoparticles could not be observed.

<Evaluation Result>

Example 1 is directed to a phosphor having a thin film formed of transparent compound with a resistivity of 0.107 Ωcm, exhibiting photoluminescence in response to irradiation of exciting light. The luminescence intensity of the photoluminescence was 1.3% the luminescence intensity of exciting light.

Comparative Example 1 is directed to a phosphor having a thin film formed of transparent compound with a resistivity of 1207 Ωcm. Comparative Example 2 is directed to a phosphor absent of a thin film formed of transparent compound. Light emittance of photoluminescence could not be clearly confirmed by both phosphors in response to irradiation of exciting light. Therefore, the emission peak wavelength, luminescence intensity, and luminescence intensity/exciting light intensity (%) of the phosphors could not be calculated.

tered in a gas atmosphere having the partial pressure of Ar and N$_2$ adjusted to attain 0.1944 Pa and 0.0056 Pa, respectively, to grow a thin film of transparent compound having a thickness of 50 nm (hereinafter, referred to as "second thin film"). Thus, the phosphor of Example 2 was obtained. The resistivity of the obtained second thin film was measured by the direct-current four-probe method. The measurement was 0.363 Ωm.

The obtained phosphor was irradiated with exciting light having a wavelength of 500 nm and a luminescence intensity of 1.21 mW/cm$^2$. The emission spectrum of the photoluminescence obtained from the phosphor was measured. Emission spectrum measurement was carried out by placing the phosphor in an integrating sphere, and introducing the light emitted from the phosphor to a detector through optical fiber attached to a side face of the phosphor. The emission spectrum of Example 2 is shown in FIG. 6.

Figure 6:
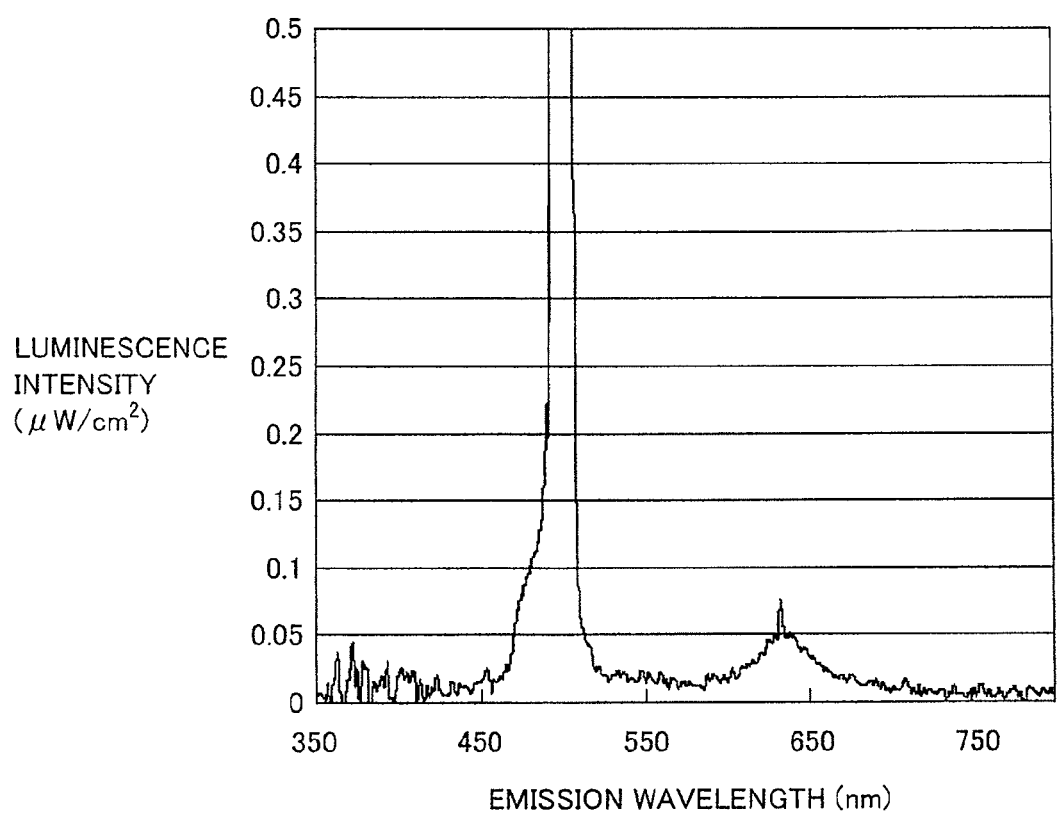
FIG. 6 represents the emission spectrum of a phosphor of Example 2 at the incidence of exciting light having a wavelength of 500 nm.

In FIG. 6, the strong light emission seen about 500 nm represents the reflection of the exciting light by the phosphor. In Example 2, an emission peak about 630 nm can also be observed. This represents light emission by the photoluminescence from semiconductor nanoparticles. In Example 2, the luminescence intensity was 15.9 μW/cm$^2$.

The resistivity of the first and second thin films formed of a transparent compound as well as the emission peak wavelength, luminescence intensity, luminescence intensity/exciting light intensity (%) of the phosphor of Example 2 are shown in Table 2.

TABLE 2

| | | Phosphor | | |
|---|---|---|---|---|
| | Resistivity of Thin Film Formed of Transparent Compound | Emission Peak Wavelength | Luminescence Intensity | Luminescence Intensity/Exciting Light Intensity |
| Example 2 | First thin film: 0.107 Ωcm Second thin film: 0.363 Ωcm | 630 nm | 15.9 μW/cm$^2$ | 1.4% |
| Comparative Example 3 | First thin film: 1207 Ωcm Second thin film: 1000 Ωcm | — | — | — |

Therefore, the phosphor of Example 1 was confirmed to have the luminescence intensity improved significantly, as compared to Comparative Example 1 having transparent compound of high resistivity and Comparative Example 2 absent of transparent compound.

Example 2

A glass substrate was prepared. On the glass substrate, a target including In, Ga, Zn and O was sputtered in a gas atmosphere having the partial pressure of Ar and N$_2$ adjusted to attain 0.1944 Pa and 0.0056 Pa, respectively, to grow a thin film of transparent compound having a thickness of 50 nm (hereinafter, referred to as "first thin film"). The resistivity of the obtained first thin film was measured by the direct-current four-probe method. The measurement was 0.107 Ωm.

Then, semiconductor nanoparticles dispersed in a toluene solvent were dispersed on the aforementioned first thin film formed of transparent compound by spin coating. For the used semiconductor nanoparticles, a semiconductor crystal core formed of CdSe and having a diameter of approximately 3 nm was covered with a shell layer formed of ZnS, further having octadecylamine coupled on the outer side of the shell layer. In the spin coating method, the rpm was 1000.

Then, on the semiconductor nanoparticles dispersed on the first thin film, a target including In, Ga, Zn and O was sput- Comparative Example 3

The phosphor of Comparative Example 3 was produced in a manner basically similar to that of Example 2, provided that the ambient condition during sputtering differed in the deposition of first and second thin films formed of transparent compound. In Comparative Example 3, sputtering was carried out in a gas atmosphere having the partial pressure of Ar adjusted to attain 0.2 Pa in growing the first thin film, and the partial pressure of Ar adjusted to attain 0.2 Pa in growing the second thin film. The resistivity of the obtained first thin film and second thin film formed of transparent compound was 1207 Ωm and 1000 Ωcm, respectively.

The obtained phosphor was irradiated with exciting light having a wavelength of 500 nm and a luminescence intensity of 1.21 mW/cm$^2$ in a way similar to that of Example 2. The emission spectrum of the photoluminescence obtained from the phosphor was measured. The emission spectrum of Comparative Example 3 is shown in FIG. 7.

Figure 7:
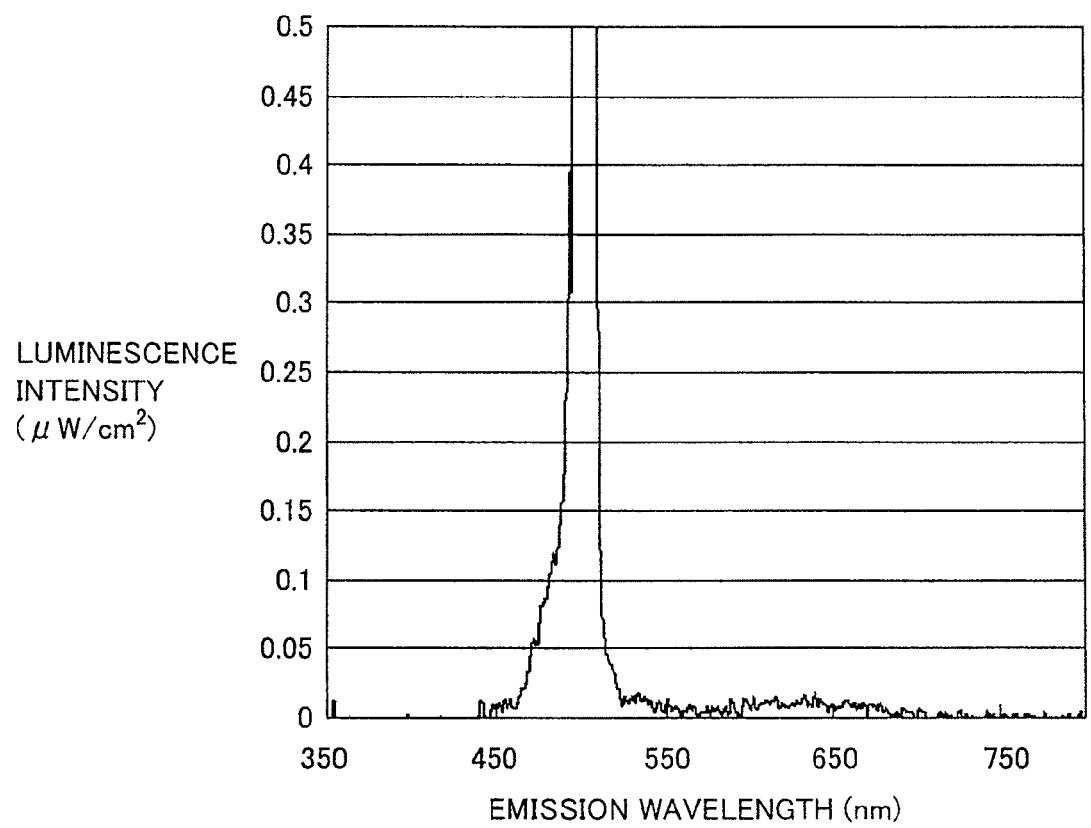
FIG. 7 represents the emission spectrum of a phosphor of Comparative Example 3 at the incidence of exciting light having a wavelength of 500 nm.

In FIG. 7, the strong light emission seen about 500 nm represents the reflection of the exciting light by the phosphor. In Comparative Example 3, an emission peak about 630 nm, representing light emission by the photoluminescence from semiconductor nanoparticles, could not be observed.

<Evaluation Result>

Example 2 is directed to a phosphor having a first thin film formed of transparent compound with a resistivity of 0.107

Ωm and a second thin film formed of transparent compound with a resistivity of 0.363 Ωcm, exhibiting photoluminescence in response to irradiation of exciting light. The luminescence intensity of photoluminescence was 1.4% the luminescence intensity of exciting light.

Comparative Example 3 is directed to a phosphor having a first thin film formed of transparent compound with a resistivity of 1207 Ωm and a second thin film formed of transparent compound with a resistivity of 1000 Ωcm. Light emittance of photoluminescence could not be clearly confirmed by the phosphor in response to irradiation of exciting light. Therefore, the emission peak wavelength, luminescence intensity, and luminescence intensity/exciting light intensity (%) of the phosphor could not be calculated.

Thus, the phosphor of Example 2 was confirmed to have the luminescence intensity improved significantly, as compared to Comparative Example 3 having transparent compound of high resistivity.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A phosphor comprising: a first conductive transparent film formed of a first conductive transparent compound, semiconductor nanoparticles provided on the first conductive transparent film and formed of compound semiconductor, and a second conductive transparent film covering the semiconductor nanoparticles provided on the first conductive transparent film, and formed of a second conductive transparent compound, wherein the first and the second conductive transparent compounds are formed of one or more kinds of metal oxide having conductance, the semiconductor nanoparticles perform wavelength conversion in which the semiconductor nanoparticles absorb part of primary light to emit secondary light which has a longer wavelength than the primary light, and wherein said metal oxide is formed of amorphous metal oxide containing at least one type of atom selected from the group consisting of indium, gallium, zinc and tin.

2. The phosphor according to claim 1, wherein said first and second conductive transparent compounds have a resistivity less than or equal to 10 Ωcm.

3. The phosphor according to claim 2, wherein said first and second conductive transparent compounds have a resistivity less than or equal to 1 Ωcm.

4. The phosphor according to claim 1, wherein said semiconductor nanoparticles are formed of at least one of III-V group compound semiconductor and II-VI group compound semiconductor.

5. The phosphor according to claim 1, wherein said semiconductor nanoparticles have an average particle size less than or equal to two times a Bohr radius.

6. The phosphor according to claim 1, wherein each of said semiconductor nanoparticles includes a semiconductor crystal core, and a shell layer covering said semiconductor crystal core.

7. The phosphor according to claim 6, wherein said shell layer is formed of a substance having an energy gap larger than an energy gap of said semiconductor crystal core.

* * * * *